US009081560B2

(12) United States Patent
Young

(10) Patent No.: US 9,081,560 B2
(45) Date of Patent: Jul. 14, 2015

(54) CODE TRACING PROCESSOR SELECTION

(71) Applicant: SunGard Data Systems Inc., Wayne, PA (US)

(72) Inventor: Benjamin Christopher Young, Ely (GB)

(73) Assignee: SUNGARD SYSTEMS INTERNATIONAL INC., Wayne, PA (US)

( * ) Notice: Subject to any disclaimer, the term of this patent is extended or adjusted under 35 U.S.C. 154(b) by 0 days.

(21) Appl. No.: 14/040,877

(22) Filed: Sep. 30, 2013

(65) Prior Publication Data
US 2015/0095879 A1 Apr. 2, 2015

(51) Int. Cl.
G06F 9/44 (2006.01)
G06F 9/45 (2006.01)

(52) U.S. Cl.
CPC *G06F 8/30* (2013.01); *G06F 8/447* (2013.01); *G06F 8/457* (2013.01)

(58) Field of Classification Search
CPC ........... G06F 8/41; G06F 8/447; G06F 8/457; G06F 9/44
USPC .......................................................... 717/106
See application file for complete search history.

(56) References Cited

U.S. PATENT DOCUMENTS

| 5,745,721 | A | * | 4/1998 | Beard et al. ................... 712/208 |
| 8,010,953 | B2 | * | 8/2011 | Gschwind ...................... 717/149 |
| 2007/0074009 | A1 | * | 3/2007 | Donofrio et al. .............. 712/222 |
| 2007/0233766 | A1 | * | 10/2007 | Gschwind ...................... 708/490 |
| 2008/0092125 | A1 | * | 4/2008 | Archambault et al. ........ 717/140 |
| 2010/0293534 | A1 | * | 11/2010 | Andrade et al. ............... 717/146 |
| 2011/0047533 | A1 | * | 2/2011 | Gschwind ...................... 717/140 |
| 2012/0079466 | A1 | * | 3/2012 | Gonion ........................ 717/150 |
| 2013/0318511 | A1 | * | 11/2013 | Tian et al. ..................... 717/157 |

* cited by examiner

Primary Examiner — Ryan Coyer
(74) Attorney, Agent, or Firm — Baker & Hostetler LLP

(57) ABSTRACT

A system for tracing operations during application execution and executing the traced operations on a second processing unit. The tracing involves identifying attempts to execute software that performs particular functions that would benefit from execution on a particular piece of non-compatible hardware and, rather than executing the code, recording the requests and the data inputs to each of the requests. At a point during execution of the software system such as, for example, when either a memory threshold has been exceeded for recording the requested code and inputs, or results are needed for the requested code, the corresponding code executable on the non-compatible hardware is identified and executed. Thereafter, the results from the execution on the non-compatible hardware are received and processing continues.

20 Claims, 3 Drawing Sheets

CODE TRACING PROCESSOR SELECTION

BACKGROUND

Computer programs are typically prepared using a particular programming language to define a series of human readable instructions. The human readable instructions are often referred to as "source code." Software developers employ the syntax and notations of a programming language to prepare a series of instructions that define the logic of the program. C#, C++, C, Perl, and PHP are just some of the programming languages that are currently popular with software developers.

Once source code defining the logic for a program has been specified, the source code is typically operated on by a computer program referred to as a compiler which transforms the human readable source code into a format, often referred to as "object code," that can be understood and executed by computing hardware. The compiler prepares the object code for execution on particular target hardware or a particular combination of hardware and operating system. For example, a compiler may generate object code that will be understood and executable on a particular type of processor running a particular type of operating system. In an example scenario, a compiler may generate object code that is executable on an Intel Core processor running a Linux operating system. In another scenario, a compiler may generate object code that is executable by a particular computing processor or application-specific integrated circuit (ASIC).

SUMMARY

In some instances, software applications that were written using a particular programming language are not compatible with subsequently developed computing hardware.

Computing hardware is constantly advancing. For example, new computing processor architectures and technologies are frequently being introduced. The new computing processors often have specialized structures that offer enhanced performance for specific types of processing. For example, a newly developed processor may be specially designed to be efficient at performing vector computations. As another example, a newly developed processing unit may be especially efficient at performing multi-threaded operations.

Specialized programming, perhaps in a newly developed programming language, is frequently required in order to access features afforded by new hardware. For example, while a recently developed processor may offer the ability to perform multi-threaded operations in an efficient manner, accessing the multi-threaded processing may require writing software using a particular programming language that compiles into object code compatible with the particular processor. Similarly, accessing the features of a processor that is especially efficient at performing vector operations may involve preparing a software program using a particular programming language, and compiling that software program for execution on the processor.

Software systems that existed before the introduction of a new hardware component may not be compatible with the new hardware. For example, a software program may have been written for execution on a general purpose computing processor. The software program may not be compatible with more recently developed technology such as a processor with enhanced features that requires specialized programming in order to access its unique features. Under circumstances where a software program is relatively small in terms of lines of code, rewriting the program using a different programming language so as to be compatible with recently developed hardware may not require a significant investment in time and resources. However, for a software program that has existed for a long period of time and comprises a large number of lines of software code, creating new source code in a software language that is compatible with a new hardware component may require a prohibitively large investment.

Applicant discloses systems and methods that, during execution of computer software, trace requests to execute code that could benefit from execution on non-compatible hardware, and execute code corresponding to the traced requests on the non-compatible hardware. More particularly, the processing involves, during execution of a software application, tracing requests within the application to execute code that has been identified as benefiting from use of the non-compatible hardware, identifying code executable on the non-compatible hardware that corresponds to the traced requests, executing the identified code on the non-compatible hardware, and receiving data resulting from the execution of the identified code on the non-compatible hardware. In an example scenario, the tracing involves identifying requests to execute software that performs particular functions that would benefit from execution on a particular piece of non-compatible hardware and, rather than executing the code, recording the requests and the data inputs to each of the requests. At a point during execution of the software such as, for example, when either a memory threshold for recording the traced code and inputs has been exceeded, or results are needed for the traced code so that processing of the application can continue, corresponding code executable on the non-compatible hardware is identified and executed.

The disclosed systems and methods may have application in a wide variety of circumstances wherein software is not compatible with a particular hardware component, but nonetheless, it is desired to employ the hardware component during execution of the software so as to take advantage of a particular feature or function of the hardware. In a typical embodiment, software executes on a hardware system that comprises, for example, a processing unit and computing memory. In an example scenario, it may be desired to have a particular portion of software code execute on a second processing unit that has particular features or functions that are believed to be beneficial. For example, the second processing unit may be particularly efficient at performing multi-threaded operations. In another example, the second processing unit may be particularly efficient at performing vector calculations. In one example scenario, the second processing unit may be a vector processing unit such as, for example, a graphics processing unit (GPU) or a general purpose graphics processing unit (GPGPU) that is specially adapted to efficiently and quickly perform vector operations.

In the example scenario wherein the second processing unit is especially adapted to efficiently perform vector calculations, a first processor may trace operations that involve vector operations and, after several such operations have been recorded, execute corresponding code on the second processor. More particularly, during execution of computer code on a first computing processor, the first computing processor identifies vector operations on vector data, where vector data is a one-or-more-dimensional array of data. Vector processing typically involves performing the same operation on multiple data points, i.e., a vector, simultaneously. Vector operations may be, for example, any operations including, for example, mathematical calculations, that operate on vector data. In an example embodiment, the computing processor may identify a vector operation on vector data by identifying a call to particular code that performs a tracing method or function. The call may be, for example, to code that is defined in an application programming interface. The code that performs the tracing may comprise therein instructions for performing vector operations. By identifying the call to code that performs tracing, the first computing processor also identifies the vector operations.

In the example scenario, after identifying vector operations on vector data, the first computing processor does not execute the identified vector operations, but records the identified vector operations and vector data inputs. For example, the first computing processor may store in computing memory an indication of the identified vector operations and the vector data inputs for each of the operations. The computing memory may be, for example, a buffer space dedicated to storing vector operations and the corresponding vector data. The computer program continues to execute and vector operations continue to be traced rather than executing. Accordingly, numerous vector operations and related input vector data may be recorded for later processing via the second processing unit.

The first computing processor eventually determines that the traced vector operations should be executed. For example, in an example scenario, the first computing processor may determine that a memory space for recording the identified vector operations and vector data inputs has reached a threshold. In another scenario, the first computing process may determine that the recorded vector operations should be executed because the output from the recorded vector operations is required for further processing within the software program.

Once the first processor determines that the traced vector operations should be executed, the first computing processor then identifies code executable on the second computing processor that corresponds to the identified vector operations. In an example scenario, the first computing processor determines if the traced vector operations, i.e., the particular vector operations that have been recorded, have previously been traced. For example, the first computing processor may search computing memory comprising previously traced operations to determine whether the traced vector operations were previously the subject of a trace and, if so, whether corresponding code executable on the second computing processor was previously identified.

In the instance where the search determines that the traced vector operations were previously the subject of a trace, code executable on the second computing processor corresponding to the traced vector operations may be retrieved from computing memory. Because the code executable on the second processor and corresponding to the traced vector operations already exists in memory, the steps of locating and compiling source code, which otherwise would need to be performed and which are relatively slow and resource intensive, are avoided.

On the other hand, in the instance where the search of memory indicates that the traced vector operations were not previously the subject of a trace, the first computing processor locates code executable on the second computing processor for the particular traced vector operations and vector inputs. For example, the first computing processor may locate in computing memory, perhaps from a library of code, compiled object code that corresponds to traced vector operations. In an another embodiment, the library may comprise uncompiled source code and the first computing processor may locate in memory source code that corresponds to the traced vector operations and which may be compiled and executed on the second computing processor. The first computing processor can match the traced vector operations with the code from the library. In the scenario wherein the code is source code, once the corresponding source code has been identified, the first computing processor compiles the source code for execution on the second processor.

Once the first computing processor has identified code executable on the second computing processor that corresponds to the traced vector operations, the first computing processor requests that the second processing unit execute the identified code using the corresponding vector input data that was recorded during the tracing. The second computing processor executes the operations using the recorded vector data. The second computing processor may store the results thereon and process subsequent operations using the results. Eventually, when the vector data results from the operations are needed by the first computing unit, the results are communicated back to the first computing unit which stores the results and continues processing the software application using the vector data results.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Applicants have developed systems and methods for tracing software code execution and selectively executing traced operations on a particular hardware component. The disclosed systems and methods may have application in a wide variety of circumstances such as wherein a software system is not compatible with a particular hardware component, but nonetheless, it is desired to employ the hardware component during execution of the software system so as to take advantage of a particular feature or function.

In an example scenario, the tracing involves identifying attempts to execute software that performs particular functions that would benefit from execution on a particular piece of hardware and, rather than executing the code, recording the requests and the data inputs to each of the requests. In many software systems, during execution of the software, the same set of instructions are repeatedly requested to be performed on different data elements. The tracing process identifies such repeated requests. At a point during execution of the software system such as, for example, when either a memory threshold has been exceeded for recording the requested code and inputs, or results are needed for the requested code, the corresponding code executable on the particular piece of hardware is identified. In some instances, the trace may have been previously performed and corresponding code executable on the particular hardware may have been previously identified and stored in memory. In other instances, corresponding source code may be identified and compiled. The identified executable code is then executed on the particular piece of hardware and the results returned.

Example Computing Arrangement

Figure 1:
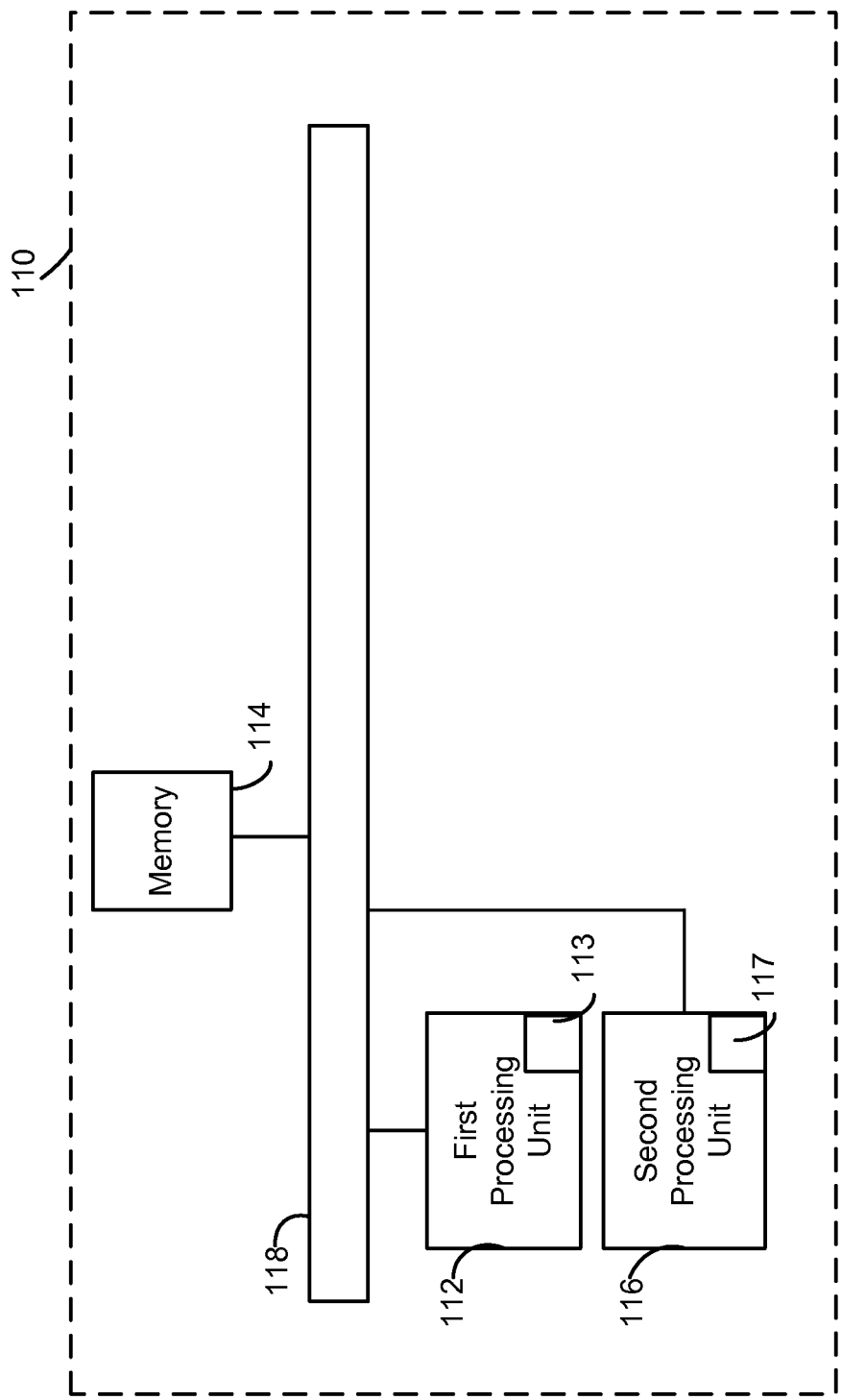
FIG. 1 is a block diagram of an example computing environment that may be used to implement systems and methods as described herein.

FIG. 1 depicts a block diagram of an example computing environment that may be used to implement systems and methods as described herein. In an example embodiment as shown in FIG. 1, software executes in a computing environment or system 110 that comprises, for example, a first processing unit 112. First processing unit 112 is adapted to execute computer software instructions and may be any type of processor that operates consistent with the description herein. In an example scenario, first processing unit 112 may be, for example, a central processing unit (CPU) and may run any number of operating systems such as, for example, Windows, Linux, etc.

In an example scenario, first processing unit 112 comprises computing memory 113. Computing memory 113 is adapted to store any information needed to perform the functionality as described herein including, for example, computer instructions and data. For example, computing memory 113 may have stored thereon executable instructions for an application that is executable on first processing unit 112. Data relating to traces that are being performed likewise may be stored on computing memory 113. Still further, computing memory 113 may have stored thereon source code corresponding to a second computing processor as well as object code that is executable on the second processor.

Example computing environment 110 further comprises second processing unit 116. Second processing unit 116 may be any computing hardware comprising a processor on which it is desired to have software execute in response to software executing on first computing unit 112. In an example embodiment, second processing unit 116 may be, for example, a processing unit that has particular features or functions that are believe to be beneficial. For example, second processing unit 116 may be particularly efficient at performing multi-threaded operations. In another example, second processing unit 116 may be particularly efficient at performing vector calculations. In one example scenario, second processing unit 116 may be a graphics processing unit (GPU) or a general purpose graphics processing unit (GPGPU) that is specially adapted to efficiently and quickly perform vector operations. Second processing unit 116 may be adapted to execute code that has been programmed in a particular language different than that of software that is executable on the first processing unit 112.

In an example scenario, second processing unit 116 comprises computing memory 117. Computing memory 117 is adapted to store any information needed to perform the functionality as described herein including, for example, computer instructions and data. For example, computing memory 117 may have stored thereon executable instructions for an application that is executable on second processing unit 116. Data relating to operations performed on second processing unit 116, including results from operations performed on second processing unit 116 likewise may be stored on computing memory 117.

Those skilled in the art will appreciate that while in an example embodiment computing memory 113 and computing memory 117 are comprised in first processing unit 112 and second processing unit 116, respectively, computing memory outside of units 112 and 116 may be accessed. For example, processing units 112 and 116 may retrieve data from and store data to computing memory 114. In an example scenario, computing memory 114 may be comprised in addition to memories 113 and 117.

Second processing unit 116 is communicatively coupled with first processing unit 112 and computing memory 114. For example, units 112 and 116 and memory 114 may be communicatively coupled via a bus and/or network 118 that is adapted to communicate data and control signals there between. Computing environment 110 may comprise components and devices in addition to components 112, 114, and 116. For example, computing environment 110 and components 112, 114, and 116 may be comprised in a computing system as discussed below in connection with FIG. 3.

Example Processing

Figure 2:
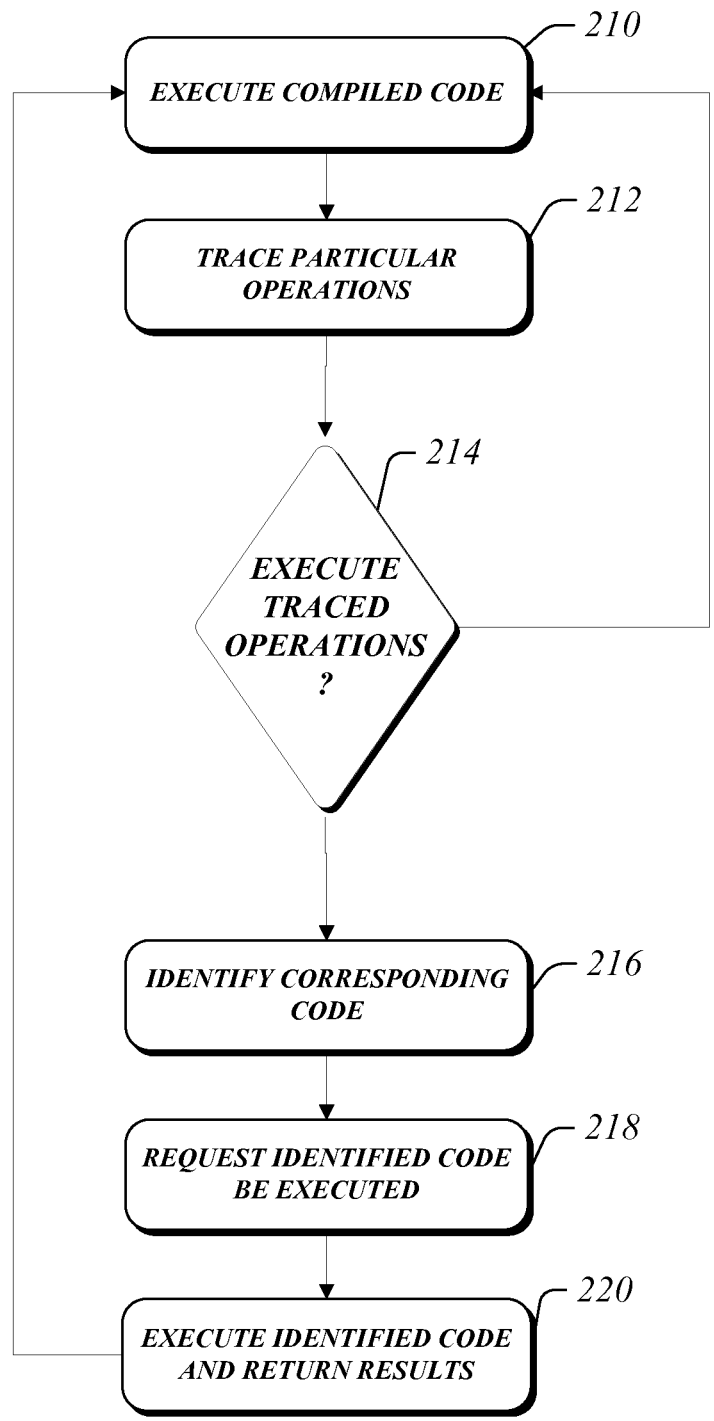
FIG. 2 is a flow diagram depicting processing for code tracing hardware selection.

FIG. 2 provides a flow diagram illustrating example processing for tracing requests to execute code that could benefit from execution of corresponding code on another hardware unit. In an example embodiment, first processor 112 has compiled object code executing thereon and uses tracing to identify particular operations called for by the code that could benefit from executing on second computing processor 116. In the example scenario wherein second processing unit 116 is especially adapted to efficiently perform vector calculations, first processor 112 may trace operations that involve vector operations and, after recording such operations during the tracing, execute corresponding code on second processor 116.

Referring to FIG. 2, at block 210, first processor 112 executes compiled code. The compiled code may perform any useful functionality. For example, the compiled code may be for a software application associated with operating a Web site. In another example embodiment, the compiled code may be for a software application that performs risk analysis. In an example scenario, the executing code performs functions that require complex vector calculations.

At block 212, during execution of the compiled code, first processor 112 traces particular operations that are requested to be performed in the executing code. The tracing process involves identifying requests to perform the operations that are to be traced and recording the requested operations and the data inputs associated with the operations. In an example scenario, first computing processor 112 identifies vector operations performed on vector data, although any type of operation may be subject to tracing. Vector operations may be, for example, any operations including, for example, calculations, that operate on, or relate to operations on, vectors and vector data. Vector data may be any data that is stored using a one dimensional or multi-dimensional array. In an example embodiment, first computing processor 112 may identify vector operations by identifying calls to code which may comprise particular functions or methods that performs vector operations. The code may be methods that are defined in an application programming interface comprising code for performing various vector operations. In an example scenario, first computing processor 112 may identify requests to perform the following code that sums two vectors ten times:

```
Vector inter = cache.GetClear( );
for (int i = 0; i < 10; ++i)
{
        inter.Add(inOne + inTwo);
}
```

In another potential scenario, first computing processor 112 may identify requests to perform vector operations that need to be traced by identifying calls in the executing code to particular methods or functions in an abstract interface that have been especially programmed to perform the tracing. For example, first computing processor 112 may identify a call to the following method titled "tracer.NewTrace":

```
tracer.NewTrace("Test"); Initializes the trace
Vector inter = cache.GetClear( );
for (int i = 0; i < 10; ++i)
{
        inter.Add(inOne + inTwo);
        tracer.CurrentTrace.Escapes(inter); Inter "escape" the loop (i.e. is
used outside the loop), as it's not a local variable. It's possible to infer
this in some cases
        tracer.FinishLoop( ); Inform the engine that we're at a loop
boundary, so that that ends the current trace, and starts recording the next
one
}
```

In this example scenario, the computing processor identifies a vector operation on vector data by identifying a call to a method or function defined in an application programming interface that has been especially inserted into the program in order to perform tracing. The tracing method, which alternatively may be referred to as a function call, may comprise therein instructions for performing vector operations. In such a situation, by identifying the call to the particular method that performs tracing of operations, i.e., a tracing method, the first computing processor has also identified the vector operations.

It should be appreciated that by employing calls to specially designated tracing methods or functions as signifying beginning of a vector operation, it is possible that the designated tracing methods can be isolated as an application programming interface (API) which may be accessed as needed. Further, use of an API provides pluggability that allows for supporting multiple different processors. For example, where the particular operations that could benefit from execution on a different computing processor have been isolated in an application programming interface, a software system can be made to access a new processor by accessing the particular application programming interface that is especially written to be compatible with the new processor.

In an example embodiment, at step 212, first computing processor 112, in addition to determining whether the code calls for a particular operation, reviews the data on which the code executes to determine whether execution of the operations on the particular code will, in fact, benefit from execution on second computing processor 114. For example, in the scenario wherein the operations that are being traced are those relating to performing operations on vector data, first computing processor 112 may examine the data to identify whether the data comprises different values in a single vector. In other words, first computing processor may determine whether the data has values such that the operation, although nominally a vector operation, due to the values of the data being operated on, the operation is implicitly scalar. If the operation is implicitly scalar due to the values of the data, e.g., the values stored in the vector are all the same, the operation may be efficiently performed on first computing processor 112 and processing on second computing processor 114 may not be needed. In such a scenario, first computing processor 112 may determine that tracing is not necessary and may execute the operations itself. If first computing processor's 112 examination of the data indicates that the data stored in a vector has disparate values, first computing processor 112 may determine that performing the relevant operations on second computing processor 114 may be appropriate.

As part of the tracing performed at step 212, and after identifying particular operations that should be traced, first computing processor 112 does not execute the identified operations, but records the identified operations and the data inputs to those operations. In other words, first computing processor 112 skips execution of the identified operations and records the identified operations and data inputs in memory 113. In the example scenario wherein vector operations are being traced, first computing processor 112 may store in computing memory 113 an indication of the identified vector operations and the vector data inputs for each of the operations. In the example code listed above for the method titled tracer.NewTrace, even though the loop executes ten times, there are only two distinct traces recorded—one where the vector variable "inter" is initialized to zero in the first loop, and one where "inter" has a vector value. In such a scenario, computing processor 112 may record in memory 113 information indicating that the first trace is executed once, and the second trace is executed nine times, and record the various inputs for each loop entry. Computing memory 113 may be any type of memory suitable for storing the appropriate records. In one embodiment, for example, computing memory 113 may be a buffer space dedicated to storing vector operations and the corresponding vector data.

Computing processor 112 continues to execute the computing program and tracing, rather than executing, particular operations. Accordingly, in the example embodiment wherein vector operations are being traced, numerous vector operations and related input vector data may be recorded in memory 113 for later processing via second processing unit 116.

Referring to FIG. 2, at block 214, first computing processor 112 continuously monitors circumstances to determine whether the operations that have been traced should be executed. First computing processor 112 continues to execute the program (block 210) and trace operations (block 212) while it is determined that the traced operations should be executed. At a point during processing, first computing processor 112 determines that the traced operations should be executed. For example, in an example embodiment wherein the traced operations are vector operations, the computing process may determine that a memory space for recording the identified vector operations and vector data inputs has reached a threshold. In an example scenario, a buffer that exist in memory 113 for storing traced operations and related data has a fixed size. When the buffer is full or nearly full, first computing processor 112 may determine that the traced operations should be executed. In another example embodiment, first computing processor 112 may determine that the recorded operations should be executed because the output from the recorded operations is required for further processing within the software programming. For example, a new trace may need to be run that has dependencies on the previously recorded trace. In the example scenario wherein the traced operations are vector operations, a new trace may need to be run of a vector operation that requires the results of previously traced vector operations. In such an instance, the traced operations need to be executed so that the results from the trace can be used in further processing.

Referring again to FIG. 2, at block 216, first computing processor 112 identifies code executable on second computing processor 116 that corresponds to the traced operations. In an example embodiment, the first computing processor determines if the traced operations, i.e., the particular operations that have been recorded, have previously been traced. This may involve first computing processor 112 searching computing memory 113 comprising previously traced operations to determine whether the traced vector operations were previously the subject of a trace and, if so, whether corresponding code executable on second computing processor 116 was previously identified. For example, a library may exist in computing memory 113 that includes previously traced operations and the corresponding code that was executable on second computing processor 116 for the operations. In the instance where the search determines that the traced vector operations were previously the subject of a trace, code executable on second computing processor 116 corresponding to the traced vector operations may be retrieved from the library in computing memory 113. Because the code executable on the second processor and corresponding to the traced vector operations already exists in memory, the steps of locating and compiling source code, which otherwise would need to be performed and which are relatively slow and resource intensive, are avoided. Accordingly, the tracing processes as described herein offer the potential to reduce overall execution time by quickly identifying previously compiled code. Indeed, as more tracing is performed, and more code is identified as corresponding to traced operations, the operating efficiency of the system is likely to improve.

In the instance where the search of memory 113 indicates that the traced operations were not previously the subject of a trace, first computing processor 112 locates corresponding code executable on second computing processor 116 for the particular traced vector operations and vector inputs. In an example embodiment, memory 114 may comprise a mapping between vector operations and source code suitable for compilation into executable code for execution on second computing processor 116. First computing processor 112 may search the mapping to locate in memory 114 source code that corresponds to the traced operations and which may be compiled and executed on second computing processor 116. Once the corresponding source code has been identified, first computing processor 112 compiles the source code into object code that is suitable for execution on second computing processor 116. As part of identifying this executable code, first computing processor 112 stores the compiled executable code in memory 113 along with information identifying that the compiled executable code corresponds to the particular traced operations. When the same set of operations are subject to tracing in the future, the corresponding executable code for second computing processor 116 can be retrieved from memory 113. Accordingly, in subsequent attempts to execute the particular operations, the identification of corresponding code executable on second computing processor 116 will be performed more quickly. Any delay associated with locating source code and compiling the source code can be thought of as being amortized over the numerous subsequent requests to perform the same operation.

At block 218, once first computing processor 112 has identified code executable on second computing processor 114 that corresponds to the traced operations, first computing processor 112 requests that second processing unit 116 execute the identified code using the corresponding input data that was recorded during the tracing. In an example scenario, the identified executable code is adapted to perform vector operations and the recorded input data comprises vector data.

At block 220, second computing processor 116 executes the identified object code using the recorded data and, when the resulting data is needed at first computing processor 112, communicates the data results back to first computing processor 112. In an example scenario, second computing processor 116 is especially designed to efficiently perform vector operations on vector data and the identified object code executes on recorded vector input data. Architectures that are especially adapted to perform vector operations such as, for example, GPU's and GPGPU's, offer the benefit that they are able to perform operations of large amounts of data simultaneously. Accordingly, delaying the actual performance of execution of operations on second computing processor 116 until there are numerous operations to be performed adds to the efficiency of the system. Upon completing execution of the identified object code, second computing processor 116 may maintain the resulting data on second computing processor 116 until such time as the data is needed for operations on first computing processor 112. The resulting data may be subject to subsequent operations on second computing processor 116 before being returned. Second computing processor 116 eventually communicates the resulting data to first computing processor 112 when the data is needed for further processing on first computing processor 112.

As illustrated by the flow lines in FIG. 2, first computing processor 112 may continue processing, including performing traces concurrently with any processing performed by second computing processor 116. When the results of processing that was requested of second computing processor 116 are need for further processing on first computing processor 112, the results are requested and received at first computing processor 112. The results from the processing may be used in the further processing performed by first computing processor 112.

Example Computing Environment

Figure 3:
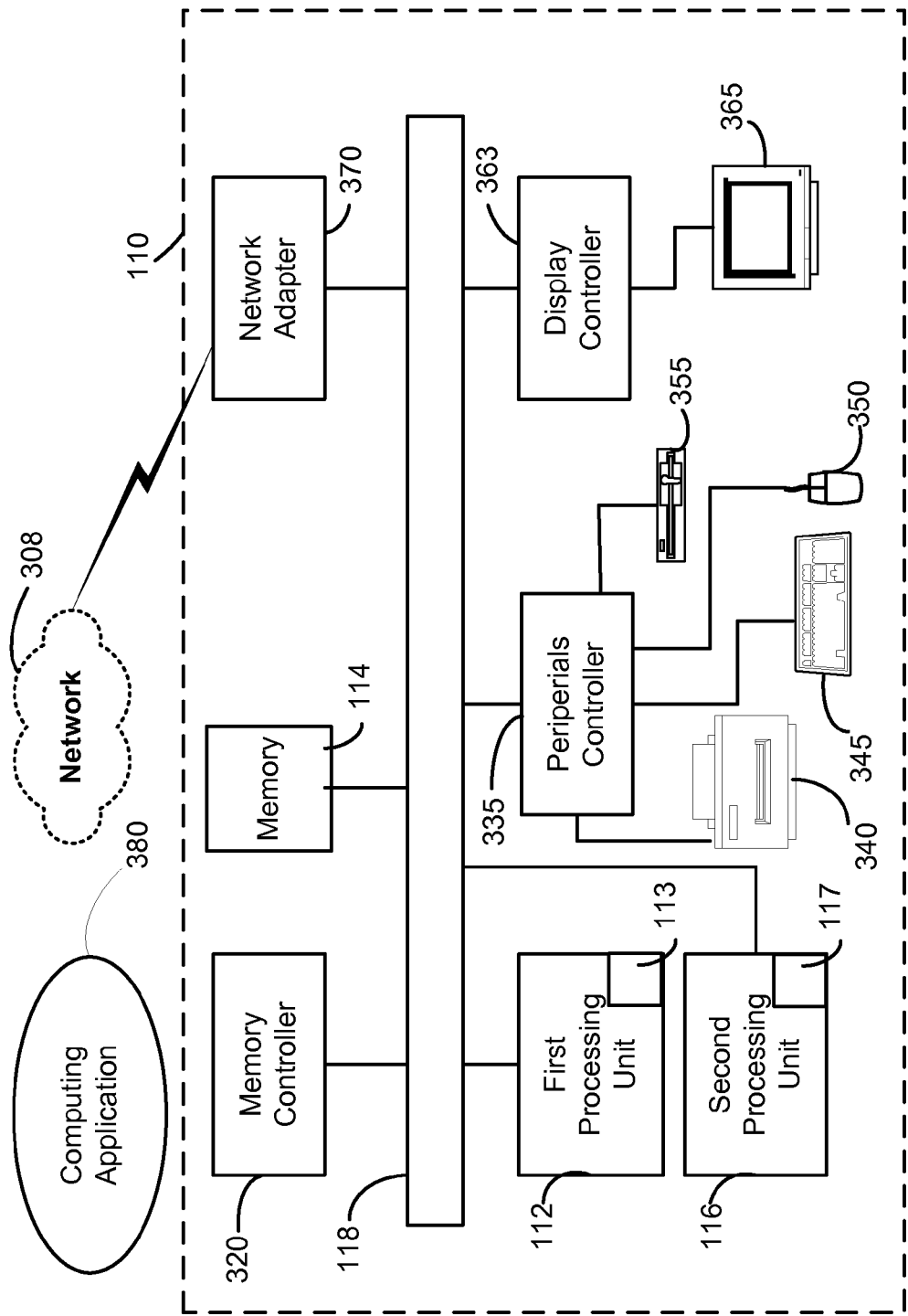
FIG. 3 is a block diagram of an exemplary computing environment that may be used to implement the systems and methods described herein.

As noted above in connection with FIG. 1, computing environment or system 110 may comprise additional components and devices. For example, computing environment 110 may comprise components and devices as shown in FIG. 3. FIG. 3 depicts an expanded block diagram of an exemplary computing environment 110 that may be used to implement the systems and methods described herein. For example, computing environment 110 may be used to implement the code tracing and processor selection as described above in connection with FIGS. 1 and 2. Computing environment 110 may be controlled primarily by computer readable instructions that may be in the form of software. The computer readable instructions may include instructions for computing system 110 for storing and accessing computer readable instructions themselves. Such software may be executed within first processing unit 112, which may be a central processing unit (CPU), to cause computing system 110 to perform the processes or functions associated therewith. In many known computer servers, workstations, personal computers, or the like, first processing unit 112 may be implemented by micro-electronic chips CPUs called microprocessors.

Computing system 110 may further comprise second processing unit 116. As noted above in connection with FIG. 1, second processing unit 116 may provide particular functions or features not available from first processing unit 112. In an example embodiment, second processing unit 116 may be relatively efficient with respect to particular operations such as, for example, vector calculations. In an example embodiment, second processing unit 116 may be, for example, a general purpose graphics processing unit (GPGPU) or similar processor.

In operation, first processing unit 112 and second processing unit 116 may fetch, decode, and/or execute instructions and may transfer information to and from other resources via a main data-transfer path or a system bus 118. Such a system bus may connect the components in computing system 110 and may define the medium for data exchange. Computing system 110 may further include computing memory device 114 coupled to system bus 118. According to an example embodiment, computing memory 114 may include random access memory (RAM) as well as read only memory (ROM). Computing memory 114 may include circuitry that allows information to be stored and retrieved. Data stored in computing memory 114 typically may be read or changed by processors 112 and 116 or other hardware devices. Access to memory 114 may be controlled by memory controller 1020. Memory controller 1020 may provide an address translation function that translates virtual addresses into physical addresses as instructions are executed.

In an example embodiment, computing system 110 may receive data and communicate data via network 118 and may not employ traditional input and output devices. However, in other embodiments, computing system 110 may further include a peripherals controller 335 that may be responsible for communicating instructions from processors 112 and 116 to peripherals, such as, printer 340, keyboard 345, mouse 350, and data storage drive 355. Computing system 110 may further include display 365 that may be controlled by display controller 363. Display 365 may be used to display visual output generated by computing system 110. Such visual output may include text, graphics, animated graphics, video, or the like. Display controller 363 may include electronic components that generate a video signal that may be sent to display 365. Further, computing system 110 may include network adaptor 370 that may be used to connect computing system 110 to an external communication network such as network 150 which may be any compatible network including, for example, the Internet and World Wide Web.

Accordingly, applicants have disclosed exemplary embodiments of systems and methods for tracing operations during application execution and executing traced operations on a second processor. The tracing involves identifying attempts to execute software that performs particular functions that would benefit from execution on a particular piece of non-compatible hardware and, rather than executing the code, recording the requests and the data inputs to each of the requests. At a point during execution of the software system such as, for example, when either a memory threshold has been exceeded for recording the requested code and inputs, or results are needed for the requested code, the corresponding code executable on the non-compatible hardware is identified and executed. Thereafter, the results from execution on the non-compatible hardware are received and processing of the program continues.

The disclosed systems and methods allow existing software applications to make use of subsequently developed hardware that may not be compatible with the software. The disclosed systems and methods operate efficiently by storing and re-using previously identified executable code that corresponds to particular operations. In many applications, it is likely that identified executable code will be re-used many times. Accordingly, any delay caused by locating source code and compiling the source code for an operation when first traced, is amortized over the numerous times that the same operation may be subsequently executed. Furthermore, because the operations that are to be subject to tracing and execution on a separate processing unit may be isolated in an application programming interface, software developers have flexibility in making changes to code and configurations that may result in new traces being performed without having to be concerned as to changes to the tracing code. Furthermore, by isolating the particular operations that may benefit from execution on a new hardware device in an application programming interface, it is possible to make the software system compatible with additional secondary computing processors.

It will be appreciated that while illustrative embodiments have been disclosed, the scope of potential embodiments is not limited to those explicitly set out. For example, while the system has been described with reference to particular scenarios wherein the traced operations relate to operations on vector data, the envisioned embodiments extend beyond vector operations. For example, the traced operations may be those operations that would benefit from execution on a processor that especially efficient at implementing multithreaded operations. Furthermore, while the systems and methods described herein refer to a first and a second processing unit, the envisioned embodiments extend beyond two processing units. Rather, in an embodiment, a third processor may provide special efficiencies and the first processor may perform trace processing as described above in identifying appropriate operations and compiling code for execution on the third processor. Indeed, it is envisioned that multiple different computing architectures may be accessible and code corresponding to traced operations executed on the different architectures. Still further, it is envisioned that during tracing, a first processor may determine which of two different processors would best be suited for execution of corresponding code.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), and a manner of receiving and communicating data, which may include input and output devices. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Those skilled in the art will appreciate that the disclosed embodiments may be provided as a subscription web based solution that anyone with an internet connection may log on and begin using the system. Large corporations may internally monitor multiple users within an exemplary embodiment platform to direct media placement. The potential embodiments may be developed and programmed in any web based technology platform. Alternatively, a potential embodiment may be implemented as a standalone application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for executing software instructions, comprising:
    during execution of first computer code on a first computing processor, executing code in the first computer code directed to non-vector operations on non-vector data;
    on the first computing processor, while continuing to execute code in the first computer code directed to non-vector operations on non-vector data, identifying in the first computer code vector operations on vector data, skipping execution of the identified vector operations, and recording the identified vector operations and vector data inputs to the identified vector operations;
    determining that the recorded identified vector operations should be implemented;
    searching computing memory having stored therein previously identified vector operations and corresponding second computer code executable on the second computing processor;
    locating the identified vector operations in the previously identified vector operations;
    retrieving from computing memory second computer code executable on the second computing processor that corresponds to the previously identified vector operations;
    executing on the second computing processor the retrieved second computer code executable on the second computing processor using the recorded vector data inputs; and
    on the first computing processor receiving vector data resulting from execution on the second computing processor of the retrieved second computer code executable on the second computing processor.

2. The computer-implemented method of claim 1, wherein identifying vector operations on vector data comprises identifying a call to computer code that comprises therein instructions for performing vector operations.

3. The computer-implemented method of claim 2, wherein identifying a call to computer code that comprises therein instructions for performing vector operations comprises identifying a call to call to code defined in an application programming interface.

4. The computer-implemented method of claim 1, wherein identifying vector operations on vector data comprises identifying a call to code that is specially designated to trace execution of vector operations.

5. The computer-implemented method of claim 1, wherein identifying vector operations on vector data comprises identifying code that performs mathematical calculations on data stored in a multi-dimensional array.

6. The computer-implemented method of claim 1, wherein skipping execution of the identified vector operations and recording the identified vector operations and vector data inputs comprises skipping execution of a plurality of vector operations and recording the plurality of vector operations.

7. The computer-implemented method of claim 1, wherein recording the identified vector operations and vector data inputs comprises recording in computing memory identification of the identified vector operations and vector data inputs.

8. The computer-implemented method of claim 1, wherein determining the recorded identified vector operations should be implemented comprises determining that a memory space for recording the identified vector operations and vector data inputs has reached a threshold.

9. The computer-implemented method of claim 1, wherein determining the recorded identified vector operations should be implemented comprises determining output from the recorded vector operations is required for further processing.

10. The computer-implemented method of claim 1, further comprising determining the identified vector operations are not in the previously identified vector operations and generating code executable on the second computing processor that corresponds to the identified vector operations.

11. The computer-implemented method of claim 10, wherein generating code executable on the second computing processor comprises identifying source code corresponding to the identified vector operations and compiling the identified source code.

12. The computer-implemented method of claim 11, further comprising storing in computing memory compiled code corresponding to the identified source code and identification of the identified vector operations corresponding to the compiled code.

13. The computer-implemented method of claim 1, wherein retrieving code executable on the second computing processor comprises identifying code executable on a computing processor that is specially structured to perform vector operations.

14. The computer-implemented method of claim 1, wherein identifying code executable on a second computing processor comprises identifying code executable on a graphics processing unit.

15. A system, comprising:
    a first computing processor;
    a second computing processor;
    computing memory communicatively coupled to the first computing processor and the second computing processor, the computing memory comprising executable computing instructions for performing operations, comprising:
        during execution of first computer code on the first computing processor, tracing operations on vector data, the tracing comprising identifying the operations on vector data, skipping execution of the identified operations, and recording the identified operations and vector data;

during execution of the computer code on the first computing processor, determining the recorded operations require execution, during execution of the computer code on the first computing processor, searching computing memory having stored therein previously executed operations and corresponding second computer code executable on the second computing processor, locating the recorded operations in the previously executed operations, and retrieving from computing memory second computer code executable on the second computing processor that corresponds to the recorded operations;

during execution of the computer code on the first computing processor, executing the identified second computer code on the second computing processor using the recorded vector data to derive vector data results; and during execution of the first computer code on the first computer processor, receiving the vector data results from the second computing processor and using the received vector data results in further processing.

16. The system of claim 15, further comprising determining the identified operations are not in the previously identified vector operations and generating code executable on the second computing processor that corresponds to the identified vector operations.

17. The system of claim 16, wherein generating code executable on the second computing processor comprises identifying source code corresponding to the identified vector operations and compiling the identified source code.

18. The system of claim 17, further comprising storing in computing memory compiled code corresponding to the identified source code and identification of the identified vector operations corresponding to the compiled code.

19. The system as recited in claim 18, wherein the first computing processor is a central processing unit and the second computing processor is a graphics processing unit.

20. A non-transitory computer readable storage medium having executable instructions stored therein that when executed by a computing system cause the computing system to perform an operations comprising:

during execution of first computer code on a first computing processor, tracing vector operations on vector data, the tracing comprising identifying the vector operations on vector data, skipping execution of the identified operations, and recording the identified vector operations and vector data;

during execution of the computer code on the first computing processor, determining the recorded vector operations require execution and identifying second computer code executable on a second computing processor that corresponds to the recorded vector operations;

during execution of the first computer code on the first computing processor, executing the identified second computer code on the second computing processor using the recorded vector data to derive vector data results; and during execution of the first computer code on the first computer processor, receiving the vector data results from the second computing processor and using the received vector data results in further processing.

* * * * *